(12) United States Patent
Ferenczi (10) Patent No.: US 12,254,462 B2
(45) Date of Patent: *Mar. 18, 2025

(54) ZERO-KNOWLEDGE PROOF-BASED VIRTUAL CARDS

(71) Applicant: American Express Travel Related Services Company, Inc., New York, NY (US)

(72) Inventor: Andras L. Ferenczi, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,492

(22) Filed: Dec. 12, 2022

(65) Prior Publication Data

US 2023/0114697 A1    Apr. 13, 2023

Related U.S. Application Data

(62) Division of application No. 16/894,000, filed on Jun. 5, 2020, now Pat. No. 11,538,019.

(51) Int. Cl.
| | |
|---|---|
| G06Q 20/34 | (2012.01) |
| G06Q 20/32 | (2012.01) |
| G06Q 20/38 | (2012.01) |
| G06Q 20/40 | (2012.01) |
| H04L 9/06 | (2006.01) |
| H04L 9/30 | (2006.01) |
| H04L 9/32 | (2006.01) |
| H04L 9/00 | (2022.01) |

(52) U.S. Cl.
CPC ....... *G06Q 20/351* (2013.01); *G06Q 20/3226* (2013.01); *G06Q 20/3278* (2013.01); *G06Q 20/38215* (2013.01); *G06Q 20/3825* (2013.01); *G06Q 20/4012* (2013.01); *H04L 9/0637* (2013.01); *H04L 9/30* (2013.01); *H04L 9/3221* (2013.01); *G06Q 2220/00* (2013.01); *H04L 9/50* (2022.05); *H04L 2209/56* (2013.01)

(58) Field of Classification Search
CPC .. G06Q 20/00–425; G06Q 2220/00–18; H04L 9/00–38; H04L 2209/00–88
See application file for complete search history.

(56) References Cited

U.S. PATENT DOCUMENTS

| | | | | |
|---|---|---|---|---|
| 5,757,918 A | * | 5/1998 | Hopkins | G07F 7/1008 713/172 |
| 5,796,833 A | | 8/1998 | Chen et al. | |
| 7,840,806 B2 | * | 11/2010 | Hammond, II | H04L 63/08 713/169 |

(Continued)

FOREIGN PATENT DOCUMENTS

TW    201804388 A   *  2/2018

*Primary Examiner* — Chenyuh Kuo
(74) *Attorney, Agent, or Firm* — Thomas | Horstemeyer, LLP (57) ABSTRACT

Disclosed are various embodiments for issuing virtual cards to client devices. Also disclosed are embodiments for provisioning a transaction terminal to process transactions with virtual cards. A zero-knowledge proof algorithm can be utilized to validate the transactions. A virtual card can be based upon a public key of a client device that is managed by a hardware security module.

20 Claims, 7 Drawing Sheets

(56) References Cited

U.S. PATENT DOCUMENTS

| | | | | |
|---|---|---|---|---|
| 8,196,131 | B1* | 6/2012 | von Behren | G06Q 20/02 |
| | | | | 705/64 |
| 9,223,965 | B2* | 12/2015 | Boivie | H04L 67/02 |
| 9,705,886 | B2* | 7/2017 | Sharma | G06Q 20/227 |
| 10,535,065 | B2* | 1/2020 | Muftic | G06Q 20/3829 |
| 11,295,297 | B1 | 4/2022 | Kushner et al. | |
| 2009/0037326 | A1* | 2/2009 | Chitti | G06Q 20/10 |
| | | | | 715/812 |
| 2013/0103545 | A1* | 4/2013 | Szu | G06Q 20/3223 |
| | | | | 705/26.1 |
| 2014/0143826 | A1* | 5/2014 | Sharp | H04L 63/20 |
| | | | | 726/1 |
| 2016/0253663 | A1* | 9/2016 | Clark | G06Q 20/341 |
| | | | | 705/75 |
| 2020/0204372 | A1* | 6/2020 | Ngo | H04L 9/3297 |
| 2022/0094675 | A1 | 3/2022 | Madisetti | |

* cited by examiner

ZERO-KNOWLEDGE PROOF-BASED VIRTUAL CARDS

CROSS-REFERENCE TO RELATED APPLICATIONS

This application is a division of, and claims priority to and the benefit of, U.S. patent application Ser. No. 16/894,000, entitled "ZERO-KNOWLEDGE PROOF-BASED VIRTUAL CARDS," and filed Dec. 16, 2020, which is hereby incorporated by reference in its entirety.

BACKGROUND

When a user engages in a transaction with a provider of goods or services, the consumer can use a payment instrument (e.g., a transaction card such as a credit or debit card) that is associated with a payment issuing service (e.g., issuer) to pay for the goods or services associated with the transaction. In this case, the user has entered into an agreement with the issuer such that the issuer agrees to pay a merchant on behalf of the user. Typically, in these situations, the merchant utilizes a transaction terminal or point-of-sale device that determines whether a user's payment instrument is authorized to enter into the transaction, and the issuer pays the provider for the outstanding balance associated with the transaction. Payment instruments are increasing in complexity and technical capability. Additionally, improving the security of payment transactions with mobile devices or transaction cards is a constant need.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for provisioning virtual cards to a client device, which can be utilized by a payment terminal, or a transaction terminal, to complete transactions against an account associated with respective virtual cards. Examples of this disclosure can also allow an account issuer to utilize a distributed ledger, such as a blockchain network, to provision a transaction terminal and facilitate transactions involving virtual cards issued to client devices. In particular, once a transaction terminal is provisioned to complete transactions with accounts associated with an issuer, a merchant's transaction terminal can authorize and complete transactions using a payment instrument such as a virtual card issued by the issuer to a client device. A client device can include a smart card (sometimes referred to as a chip card or integrated circuit card), a mobile device (e.g., a mobile phone or wearable device), or any other device that can be equipped with a hardware security module (HSM).

According to various embodiments, a virtual card can be generated by an issuer and instantly issued to a client device with a hardware security module. A card number for the virtual card need not be known by the user, and the user need not wait for a physical card to be shipped to the user. A virtual card can be created based upon an exchange of public keys associated with key pairs between an issuer system and the user's client device. The virtual card can include a public key of the client device that is signed by a private key associated with the card issuer. The virtual card can be used by the user (via a client device) to complete transactions with a merchant's transaction terminal, which can authorize a transaction with the virtual card using a zero-knowledge proof algorithm.

In some embodiments, transaction terminals of a merchant can be provisioned or configured to accept transactions with a particular issuer using a distributed ledger. Additionally, an issuer can publish the identities of issued virtual cards onto a distributed ledger, as well as publish an indication of the virtual cards that are subsequently revoked by the issuer.

Figure 1:
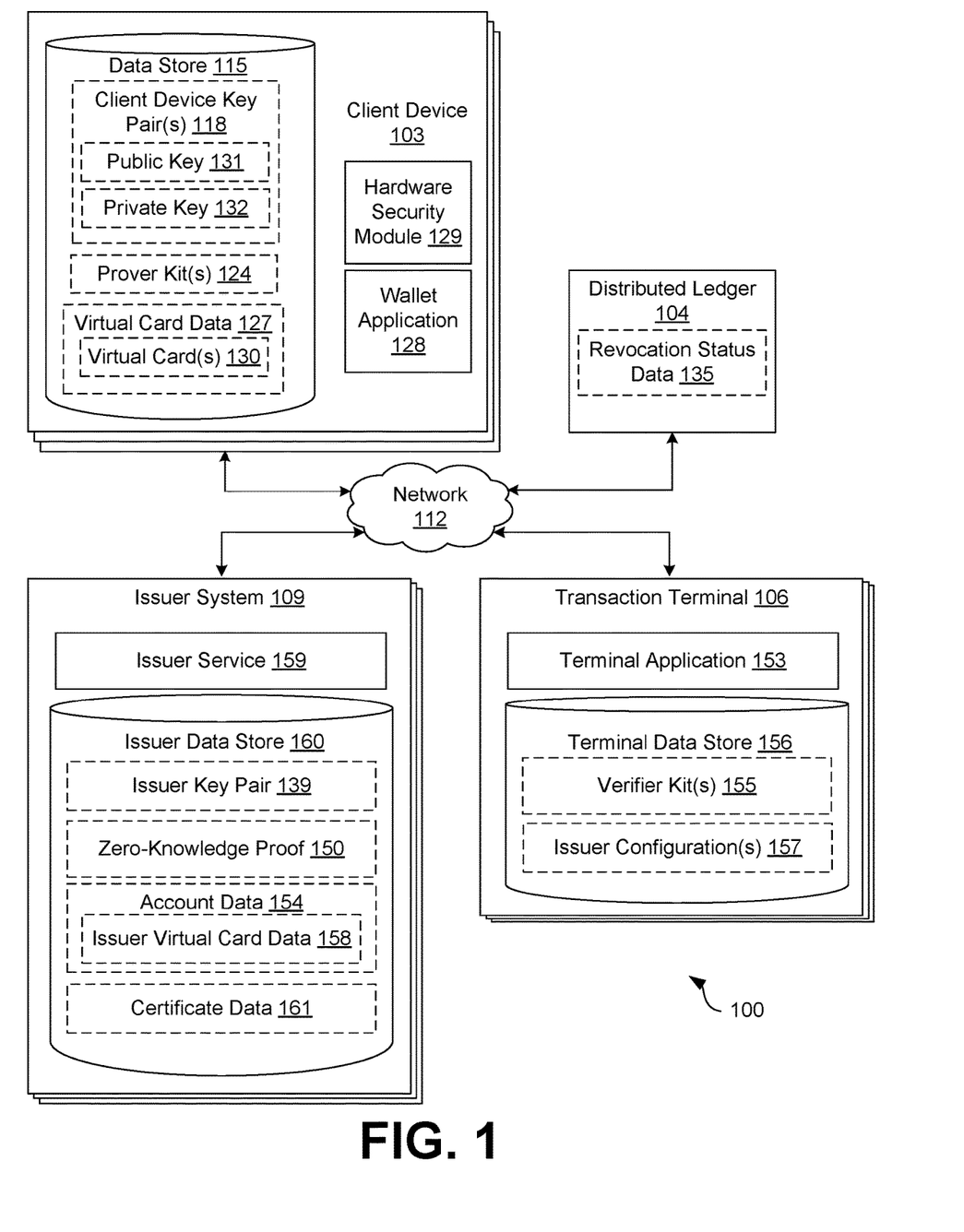
FIG. 1 is a drawing of a network environment according to various embodiments of the present disclosure.

With reference to FIG. 1, shown is a network environment 100 according to various embodiments. The network environment 100 includes one or more client devices 103, one or more transaction terminals 106, and an issuer system 109, which are in data communication with each other via a network 112. The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

A client device 103 can be a computer system or device that includes a processor, a memory, a network interface, and various other hardware. Such a computer system may be embodied in the form of a mobile device, a laptop computer, a server computer, or other devices providing computing capability. In some instances, a client device 103 can comprise a smart card having a chip or other computing capability, such as a transaction card with a EUROPAY®, MASTERCARD®, and VISA® (EMV) compliant chip that provides computing capability. In some examples, the client device 103 may not be coupled to the network 112 and might only be equipped with the ability to communicate with a transaction terminal 106 over a short-range communication interface, such as near-field communication (NFC).

The client device 103 can execute a wallet application 128. The wallet application 128 can communicate with an issuer system 109, transaction terminal 106 and other systems to initiate provisioning of virtual cards, initiate payments with a transaction terminal 106, display information about virtual cards and transactions, and communicate with a hardware security module (HSM) 129 or other secure elements on the client device 103.

The data store 115 represents mass storage or memory in which the client device 103 can store information. The data store 115 can include one or more client device key pairs 118 and one or more prover kits 124. A client device key pair 118 can represent a public key 131 and a corresponding private key 132. A private key 132 can have multiple public keys 131 with which it is associated. For example, the client device 103 can generate multiple public keys 131 that are each associated with respective virtual cards for one or more accounts with one or more issuers. The private key 132 of the client device 103 can be utilized by the client device 103 to sign communications to an issuer system or a merchant system that can be verified using a corresponding public key 131 or by querying a certificate authority. In some embodiments, the client device 103 can also be associated with a certificate issued by a certificate authority.

The client device key pair 118 can correspond to an asymmetric cryptographic key-pair that can be used to verify transactions or communications with the issuer system 109 and/or the transaction terminal 106. The cryptographic keys in the key-pair can be used to facilitate the issuance of virtual cards to a client device 103 by an issuer. For example, the issuer system 109 can obtain a public key 131 of the client device 103, sign the public key 131 with a private key of the issuer system 109, and issue the signed public key 131 back to the client device 103 as a portion of a virtual card. The private key 132 of the client device 103 can also be used to sign proofs according to a zero-knowledge proof algorithm that are generated by the client device 103 and provided to the terminal application 153 to conduct payment transactions. The key-pair can be generated using various approaches, such as elliptic curve cryptography (ECC) approaches or using the Rivest-Shamir-Adleman (RSA) algorithm.

A prover kit 124 can be a script, application, or process that is executed by the client device 103, or the HSM 129 of the client device 103, to generate a proof that it possesses certain information according to a zero-knowledge proof algorithm. A zero-knowledge proof algorithm can be negotiated with an issuer system or a merchant's transaction terminal so that the client device 103 can generate the proof to prove that it is authorized to conduct transactions on behalf of an account with the issuer.

A zero-knowledge proof is a method by which a proving party (e.g., the client device 103) can prove to a verifying party (e.g., the transaction terminal 106) that they possess certain information (e.g., the authorization to authorize payments on behalf of a user's account) while only providing to the verifying party the fact that they possess the information. As such, the proving party is in possession of information that is not provided to the verifying party, and the verifying party is able to prove that the information is what the proving party states is the information through a performance of the steps of the zero-knowledge proof. An interactive zero-knowledge proof requires interactions between the two-parties, so that the verifying party can validate the proof. In contrast, a non-interactive zero-knowledge proof is a method that allows the verifier to validate the proof without any type of interaction from the proving party.

A non-interactive zero-knowledge proof can be utilized by embodiments of the present disclosure and allow a transaction terminal 106 to validate or otherwise verify a transaction with an account associated with a virtual card, without the client device 103 needing to expose sensitive data, such as a private key corresponding to a public key 131 associated with a virtual card. According to various embodiments, a non-interactive zero-knowledge proof utilized by a transaction terminal 106 may correspond to an algorithm such as Zero-Knowledge Succinct Non-Interactive Argument of Knowledge (zk-SNARKs).

Virtual card data 127 can include information associated with a virtual card 130 issued to the client device 103 by an issuer. The virtual card 130 can include a public key 131 of the client device 103 that has been signed by the issuer and issued to the client device 103. The virtual card data 127 can include other information associated with a virtual card 130, such as a reference to a prover kit 124 specified by the issuer, or a copy of a prover kit 124 specified by the issuer. In some embodiments, the specific zero-knowledge proof algorithm utilized to complete a transaction with a transaction terminal 106 can be negotiated between the client device 103 and the transaction terminal 106. In other examples, the zero-knowledge proof algorithm can be specified by the issuer of a virtual card 130.

The virtual card data 127 can include information such as commitment data, which can include one or more restrictions provided by the issuer to the client device 103 when a virtual card 130 is issued to the client device 103. The commitment data can be encrypted using a key that is inaccessible to the client device 103 or by using a public key 131 of the client device 103. The restrictions can be associated with a virtual card 130 issued to the client device 103. The restrictions can include a daily spending limit, a transaction maximum amount, or other restrictions imposed by an issuer on a user's virtual card 130. The commitment data can be embedded into a proof generated by a prover kit 124 that is provided to a transaction terminal 106, which can be used by the transaction terminal 106 to determine whether a particular transaction should be approved or denied, by determining whether the transaction complies with the restrictions set forth by the commitment data.

The virtual card data 127 can also include other information associated with a virtual card 130, such as imagery (that can be displayed on a display of a client device 103 when the card is visually rendered), a virtual card number, user information, and other data that might facilitate using a virtual card 130 on a client device 103.

The HSM 129 of the client device 103 is a device or subcomponent of the client device 103 that manages the client device key pairs 118, performs prover kit 124 operations, and handles other cryptographic and security-related functions of the client device 103. The HSM 129 can include one or more cryptoprocessor chips or a processor that executes software that performs cryptographic operations on behalf of the client device 103. In some embodiments, the HSM 129 can communicate with the wallet application 128, which can in turn utilize a network interface of the client device 103 to communicate with transaction terminals 106 or issuer systems 109. The wallet application 128 and HSM 129 can facilitate transactions on behalf of a user's account with an issuer by exchanging transaction details, generating a proof using a prover kit 124 specified for the transaction, and providing the proof to a transaction terminal 106. In this sense, the wallet application 128 and HSM 129 can use a virtual card 130 issued to the client device 103 to complete transactions with a transaction terminal 106 of a merchant.

The transaction terminal 106 is associated with a merchant (e.g., a seller, a supplier, etc.) that engages in a transaction with a client device 103 with respect to the exchange of goods and services with a payment of funds. The issuer system 109 is associated with an issuer that can provide to the merchant a payment on behalf of the consumer. As such, the customer may have an established relationship with an issuer where the issuer has provided the customer with a virtual card 130 to a client device 103 that the consumer can provide or present to the merchant for payment of the goods and/or services associated with the transaction.

The transaction terminal 106 is representative of a plurality of computing devices that can be coupled to the network 112. The transaction terminal 106 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), a payment terminal, a point of sale (PoS) system, or other devices with like capability.

Various applications or other functionality can be executed by the transaction terminal 106 according to various embodiments. The components executed on a transaction terminal 106 can include a terminal application 153 and other applications, services, processes, systems, engines, or functionality not discussed in detail herein.

The terminal application 153 can communicate with an issuer system 109 to get provisioned to conduct transactions with virtual cards 130 issued to client devices 103 by the issuer system 109. The virtual cards 130 can be associated with accounts of users or entities with an issuer. The terminal application 153 can also communicate with client devices 103 to conduct transactions with virtual cards 130 that are presented to the terminal application 153 as described herein. The terminal application 153 can determine whether a particular transaction is approved or denied based upon information presented by a client device 103 and potentially other information, such as a transaction authorization obtained from the issuer system 109, or information obtained from a distributed ledger.

The terminal application 153 can also communicate with one or more nodes associated with a distributed ledger 104 for various purposes. A distributed ledger 104 can represent a synchronized, eventually consistent, data store spread across multiple nodes, some or all of which may be in different geographic or network locations. Records of transactions involving the distributed ledger 104 can be shared or replicated using a peer-to-peer network connecting the individual nodes that can write to the distributed ledger 104. Once information is written in the distributed ledger 104, it can be replicated across the peer-to-peer network until the record is eventually recorded with all of the nodes. Various consensus methods can be used to ensure that data is written reliably to the distributed ledger 104. Examples of a distributed ledger 104 can include blockchains, distributed hash tables (DHTs), and similar data structures.

First, the terminal application 153 can obtain from a distributed ledger 104 a verifier kit 155, or an identity of a verifier kit 155, that is specified by issuers of virtual cards 130 for use in conducting and verifying transactions with virtual cards 130 issued by that issuer. Second, the terminal application 153 can query a distributed ledger 104 to determine whether a particular virtual card 130 has been issued and/or revoked by the issuer. A public key 131 of a client device 103 corresponding to a virtual card 130 can be published on the distributed ledger 104 when issued by the issuer to the client device 103. A revocation message, or an indication of a revocation of the virtual card 130, can also be published to the distributed ledger 104. A revocation message can be a message or primitive published to the distributed ledger 104 that indicates that a virtual card 130 has been revoked by the issuer or is no longer valid. The revocation message can include a public key 131 of the client device that corresponds to the virtual card 130 that has been revoked. Accordingly, the terminal application 153, when determining whether to process or deny a transaction with a client device 103, can check the distributed ledger 104 to determine the revocation status of a virtual card 130.

Also, various data is stored in a terminal data store 156 that is accessible to the transaction terminal 106. The terminal data store 156 can be representative of a plurality of terminal data stores 156, which can include relational databases, object-oriented databases, hierarchical databases, hash tables or similar key-value data stores, as well as other data storage applications or data structures. The data stored in the terminal data store 156 is associated with the operation of the various applications or functional entities described below. This data can include one or more verifier kits 155, issuer configurations 157, and potentially other data.

The verifier kits 155 can represent a script, application, or process that is executed by the terminal application 153 to verify a proof according to a zero-knowledge proof algorithm. The zero-knowledge proof algorithm can be negotiated with an issuer system 109 or a client device 103, so that the terminal application 153 can verify a proof provided by a client device 103 to prove that it is authorized to conduct transactions on behalf of an account with the issuer. Maybe mention that the verifier kits or hashes or signatures for verifier kits can be stored in the blockchain. That way, a transaction terminal can know that its downloading or using a verifier kit that has not been tampered with or otherwise altered?

Issuer configurations 157 can include configuration data associated with an issuer for which the transaction terminal 106 is configured to accept transactions. The issuer configuration 157 for an issuer can include a reference to a zero-knowledge proof algorithm or an issuer kit specified by the issuer for transactions. The issuer configuration 157 for an issuer can also include a copy of an issuer kit corresponding to a zero-knowledge proof specified to be used for transactions with virtual cards 130. An issuer configuration 157 can also include information about a distributed ledger 104 on which information about the revocation status of virtual cards 130 might be published by the issuer. The issuer configuration 157 can specify which distributed ledger 104 is utilized to store information about issued virtual cards 130 and zero-knowledge proof algorithms and how information is stored and retrieved from the distributed ledger 104.

The issuer system 109 is representative of a plurality of computing devices that can be coupled to the network 112. The issuer system 109 can include a corresponding computer system or computing device with a processor and a memory. Such a computer system can be embodied in the form of a personal computer (e.g., a desktop computer, a laptop computer, or similar device), a cluster of computing devices, servers, virtualized computing systems, or other devices with like capability.

Various applications or other functionality can be executed by the issuer system 109 according to various embodiments. The components executed on an issuer system 109 can include an issuer service 159 and other applications, services, processes, systems, engines, or functionality not discussed in detail herein.

The issuer service 159 can issue virtual cards 130 associated with accounts to client devices 103. The issuer service 159 can also provision transaction terminals 106 to accept payments using virtual cards 130 issued by the issuer service 159.

The issuer service 159 can also publish a revocation status of virtual cards 130 on a distributed ledger 104 as revocation status data 135. Additionally, as noted above, the issuer service 159 can provision transaction terminals 106 by publishing information about a zero-knowledge proof algorithm specified for use when approving transactions associated with virtual cards 130 issued by the issuer. The issuer service 159 can also publish other information about provisioning a transaction terminal 106, such as, server addresses for communicating with the issuer service 159 and other configuration and provisioning parameters.

The issuer service 159 can issue a virtual card 130 to a client device 103 at the request of an account holder or representative of the issuer. The virtual card 130 can be based on a public key 131 of the client device 103, which can be managed by the HSM 129. Accordingly, the HSM 129 or wallet application 128, or another component or application of the client device 103, can provide a public key 131 of a client device key pair 118 to the issuer service 159, and the issuer service 159 can authorize or deny the transaction request.

In some embodiments and for certain transactions, the transaction terminal 106 can be authorized to approve or reject a transaction without consulting the issuer service 159 based upon a zero-knowledge proof algorithm specified by the issuer. If the terminal application 153 determines that a proof generated by the client device 103 is valid and that the criteria set forth by the commitment data associated with a respective virtual card 130 is met, the transaction can be approved without consulting the issuer service 159. In other embodiments, the issuer service 159 can receive transaction details for a given transaction from the terminal application 153. Using the transaction details included in the request, the issuer service 159 can confirm that funds or credit is available for a given payment instrument, such that the payment transaction is authorized to proceed or not authorized to proceed. Further, the issuer service 159 may perform its own risk analysis to determine whether to authorize or deny the payment transaction. Upon authorization of the transaction, the issuer service 159 can generate a transaction confirmation identifier and send the transaction confirmation identifier to the terminal application 153.

Also, various data is stored in an issuer data store 160 that is accessible to the issuer system 109. The issuer data store 160 can be representative of a plurality of issuer data stores 160, which can include relational databases, object-oriented databases, hierarchical databases, hash tables or similar key-value data stores, as well as other data storage applications or data structures. The data stored in the issuer data store 160 is associated with the operation of the various applications or functional entities described below. This data can include an issuer key-pair 139, a zero-knowledge proof 150, account data 154, which can include issuer virtual card data 158, a certificate, and potentially other data.

The issuer key-pair 139 can represent a public key and a corresponding private key. An issuer key-pair 139 can correspond to an asymmetric cryptographic key-pair that can be used to verify transactions or communications with the client device 103 and/or the transaction terminal 106. The cryptographic keys in the key-pair can be used to facilitate the issuance of virtual cards 130 to a client device 103 by an issuer. For example, the issuer system 109 can obtain a public key 131 of the client device 103, sign the public key 131 with a private key of the issuer system 109, and issue the signed public key 131 back to the client device 103 as a portion of a virtual card 130. As with the client device key pair 118, the key-pair can be generated using various approaches, such as elliptic curve cryptography (ECC) approaches or using the Rivest-Shamir-Adleman (RSA) algorithm.

The zero-knowledge proof 150 represents a zero-knowledge proof algorithm specified by the issuer for interactions between the client device 103 and transaction terminal 106. The zero-knowledge proof 150 can include a reference to multiple algorithms that are approved for use by the transaction terminal 106 and client device 103. The issuer data store 160 can also store copies or references to prover kits 124 and verifier kits 155 that are accepted for use by the client device 103 and transaction terminal 106 for payment transactions.

According to various embodiments, the non-interactive zero-knowledge proof 150 specified by the issuer can be used by the terminal application 153 to verify that the client device 103 is in possession of a virtual card 130 (e.g., a client device public key 131 signed by the issuer, transaction details, and/or commitment data) without the terminal application 153 needing to possess the virtual card 130 itself.

Account data 154 can represent account information for accounts issued by the issuer. Account data 154 can include account numbers, authorized users, authentication information, account balances, and other account-related information. Issuer virtual card data 158 can include information about virtual cards 130 that are issued by the issuer and registered to an account maintained by the issuer. Issuer virtual card data 158 can include a public key 131 associated with a client device 103 that is linked to a virtual card 130. Issuer virtual card data 158 can also include commitment data associated with the virtual card 130, which can include one or more restrictions linked to the virtual card 130.

Certificate data 161 can include information about one or more certificates, such as public key certificates, that are associated with the issuer. A certificate can be issued by a certificate authority and correspond to an issuer key-pair 139 so that ownership of the issuer key-pair 139 can be validated that other systems. The issuer service 159 can sign information with a certificate that is subsequently provided to a distributed ledger 104, the transaction terminal 106 or client devices 103 so that the authenticity of the information provided can be validated.

Figure 2A:
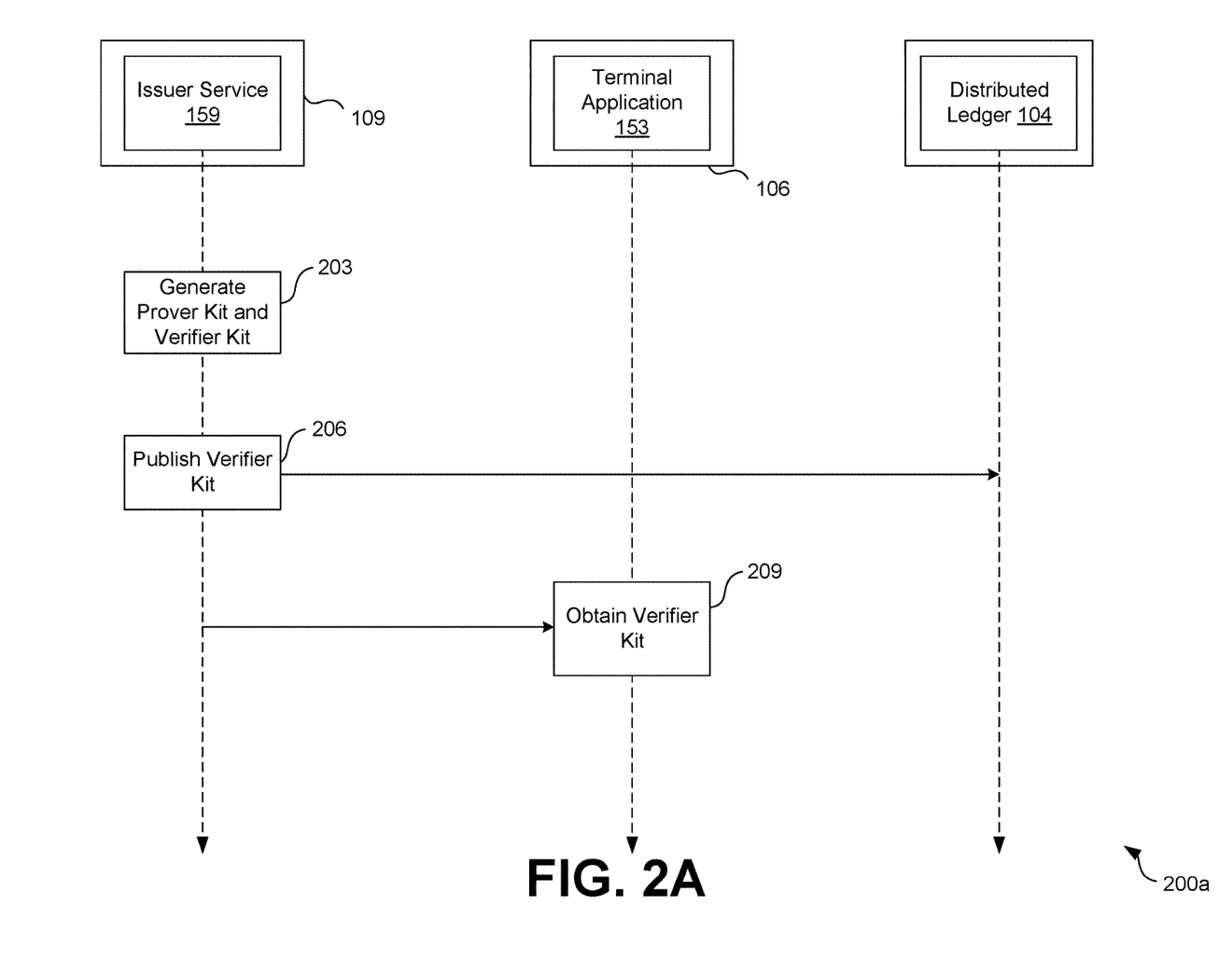
FIGS. 2A and 2B are sequence diagrams illustrating examples of functionality implemented as portions of the network environment of FIG. 1 according to various embodiments of the present disclosure.
Figure 2B:
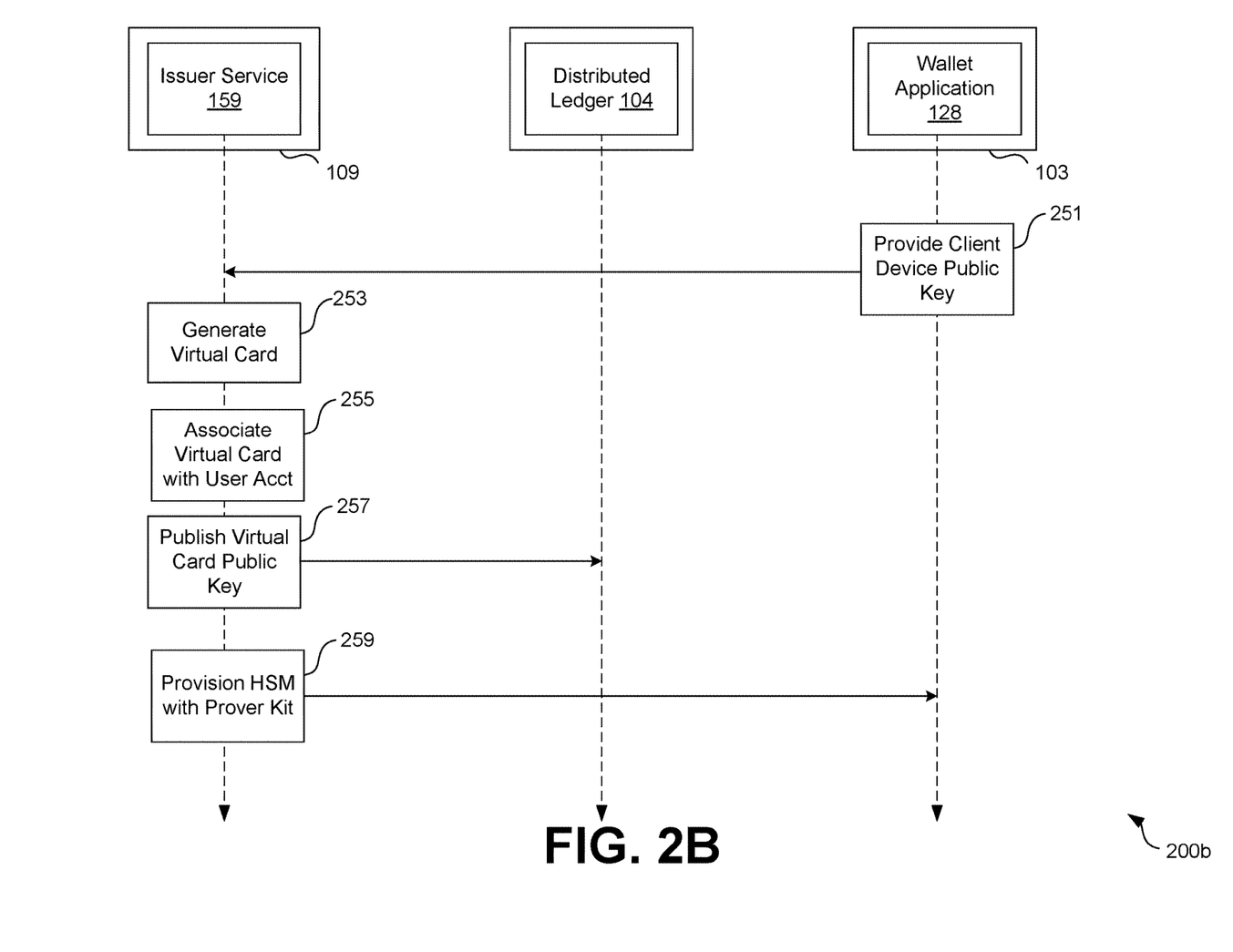

Turning now to FIGS. 2A-2B, shown are sequence diagrams 200a, 200b that provide an example of the operation of the components of the network environment 100. It is understood that the sequence diagrams of FIGS. 2A-2B provide merely an example of the many different types of functional arrangements that can be employed to implement the operation of the depicted portion of the network environment 100. As an alternative, the sequence diagrams of FIGS. 2A-2B can be viewed as depicting an example of elements of a method implemented within the network environment 100. In particular, the sequence diagrams of FIGS. 2A and 2B depict the functionality associated with the client device 103, the transaction terminal 106, and the issuer system 109 provisioning a transaction terminal 106 to accept payments from a virtual card 130 issued by the issuer. The sequence diagrams also depict how the issuer system 109 can issue virtual cards 130 to a client device 103 according to examples of the disclosure.

To begin, an issuer can allow a merchant with a transaction terminal 106 to accept payments from customers using cards issued by the issuer. In some cases, the cards issued by the issuer can be virtual cards 130 issued to or otherwise associated with a client device 103 according to examples of the disclosure. To enable a transaction terminal 106 to accept payments from client devices 103 on which virtual cards 130 have been deployed, the issuer service 159 can provision the terminal application 153. In some embodiments, provisioning of the transaction terminal 106 can be initiated by a user associated with a merchant who is configuring the transaction terminal 106 to accept payments from virtual cards 130 issued by the issuer. Provisioning the transaction terminal 106 can also be initiated upon startup or resetting of the transaction terminal 106.

First, at step 203, the issuer service 159 can generate a prover kit and/or verifier kit corresponding to a zero-knowledge proof algorithm specified by the issuer for use by transaction terminals 106 and client devices 103 to conduct transactions. The zero-knowledge proof algorithm can be a non-interactive zero-knowledge proof algorithm. In some embodiments, the prover kit 124 and verifier kit 155 can be specified by the issuer and stored as zero-knowledge proof 150 data in the issuer data store 160. In some embodiments, the prover kit 124 is the same for each device implementing the specified zero-knowledge proof 150. Similarly, the verifier kit 155 is the same for each device implementing the specified zero-knowledge proof 150.

At step 206, the issuer service 159 can publish the verifier kit 155 for a transaction terminal 106 that is being provisioned. In some embodiments, the issuer service 159 can also publish an issuer configuration 157 to accompany the verifier kit 155, which can contain other configuration parameters associated with setting up a transaction terminal 106 to accept payments on behalf of the issuer. In one example, the verifier kit 155 can be published on a distributed ledger 104 so that a transaction terminal 106 can obtain the verifier kit 155 specified by the issuer without needing to download the verifier kit 155 from the issuer service 159. Publishing the verifier kit 155 and potentially the issuer configuration 157 on a distributed ledger 104 can decentralize the process of provisioning transaction terminals 106. Additionally, utilizing a distributed ledger 104 allows for updates to issuer configurations 157 or verifier kits 155 specified by the issuer to also become decentralized, which can minimize strain on an issuer service 159.

In some embodiments, the verifier kit 155 and/or issuer configurations 157 published on the distributed ledger 104 can be signed by the certificate associated with the issuer so that transaction terminals 106 obtaining the published information can verify their respective authenticities.

At step 209, the terminal application 153 can obtain the verifier kit 155 and/or issuer configuration 157 associated with an issuer. The verifier kit 155 can be stored on the transaction terminal 106 for use with verifying proofs generated by the client device 103 in payment transactions. In some embodiments, the terminal application 153 can obtain the verifier kit 155 and/or issuer configuration 157 directly from the issuer service 159 as a result of an exchange of communications between the two systems. In other embodiments, the terminal application 153 can obtain the verifier kit 155 and/or issuer configuration 157 from the distributed ledger 104 and save the obtained data in the terminal data store 156. In some embodiments, the terminal application 153 can obtain an identity of the zero-knowledge proof algorithm specified by the issuer from the issuer service 159 or an identity of the verifier kit 155, and then download the verifier kit 155 and/or issuer configuration 157 from a location specified by the distributed ledger 104 or by the issuer service 159.

Upon obtaining a verifier kit 155 and/or issuer configuration 157 specified by the issuer, the transaction terminal can be considered provisioned to accept or reject transactions using virtual cards 130 issued by the issuer to client devices 103.

With reference now to FIG. 2B, sequence diagram 200b illustrates how the issuer service 159 can generate and issue a virtual card 130 to a client device 103. When provisioned, the client device 103, equipped with an HSM 129, can utilize the virtual card 130 to make payment transactions with a transaction terminal 106.

The process set forth in FIG. 2B can be initiated by a user of a client device 103 utilizing a wallet application on 128, for example. First, at step 251, the HSM 129 can provide a public key 131 of the client device 103 to the issuer service 159. The public key 131 can be one or many public keys 131, or a single public key 131 that is managed by the HSM 129. The public key sent to the issuer system 109 can form the basis for a virtual card 130 issued by the issuer service 159 to the client device 103. Along with the public key 131, the client device 103 can also send a user or account identifier so that the issuer service 159 can identify an account with which to associate a newly created virtual card 130.

At step 253, the issuer service 159 can generate a virtual card 130 based upon the public key 131 provided by the HSM 129 or a wallet application 128 running on the client device 103 to the issuer service 159. The issuer service 159 can also register the virtual card 130 with an account of a user or entity. To create a virtual card 130, the issuer service 159 can consult the account data 154 associated with the user or entity to determine whether the account is entitled to a virtual card 130 to be issued to the client device 103.

Assuming the account is entitled to be issued a virtual card 130, the issuer service 159 can sign the public key 131 of the client device 103. The issuer service 159 can also generate one or more commitment parameters that are bundled with the virtual card 130. The commitment data can define one or more restrictions associated with a virtual card 130. The restrictions can comprise permissions or limits that can be enforced by the transaction terminal 106 without needing to consult the issuer service 159. The commitment parameters can be encrypted using a public key 131 of the client device 103. The commitment parameters can also be signed by a private key of the issuer. In one embodiment, the commitment parameters can be unique to the virtual card 130 issued to the client device.

The virtual card 130 can also include other data, such as imagery used by a wallet application on the client device 103 to display when the virtual card 130 is viewed within the wallet application 128. The virtual card 130 can include other information associated with the account or card, such as legal agreements, disclaimers, and other metadata that can be provided to the client device 103 along with the virtual card 130.

At step 255, the issuer service 159 can register the virtual card 130 with an account of the user or entity requesting the card. The virtual card 130 can be uniquely associated with the account such that different virtual cards 130 associated with the account have different identifiers or virtual card numbers. The virtual card 130 can be registered with an account with the issuer so that transactions processed by the transaction terminal 106 can be charged and/or credited against the correct account.

At step 257, the issuer service 159 can publish a public key 131 corresponding virtual card 130 to a distributed ledger 104. The public key 131 that is published can be signed by a certificate of the issuer. The issuer service 159 can also publish a public key 131 corresponding to revoked virtual cards 130 to the distributed ledger 104 so that transaction terminals 106 can identify virtual cards 130 that have been revoked by the user.

At step 259, the issuer service 159 can provision the client device 103 of with the virtual card 130 generated at step 253. The virtual card 130 can include a signed public key 131 of the client device 103 along with the commitment data associated with the virtual card 130. The data associated with the virtual card 130 can be stored on or managed by the HSM 129. The HSM 129 can encrypt the commitment parameters with a public key 131 of the client device 103 and store the commitment parameters along with the signed public key 131 and any other data provided by the issuer service 159 as a part of the virtual card 130. The commitment data, again, can represent restrictions and other security limits that can be verified by the transaction terminal 106 when a transaction is being conducted between the client device 103 and the transaction terminal 106 using the virtual card 130. Accordingly, the client device 103 can now be considered provisioned with the virtual card 130 generated by the issuer service 159.

Figure 3A:
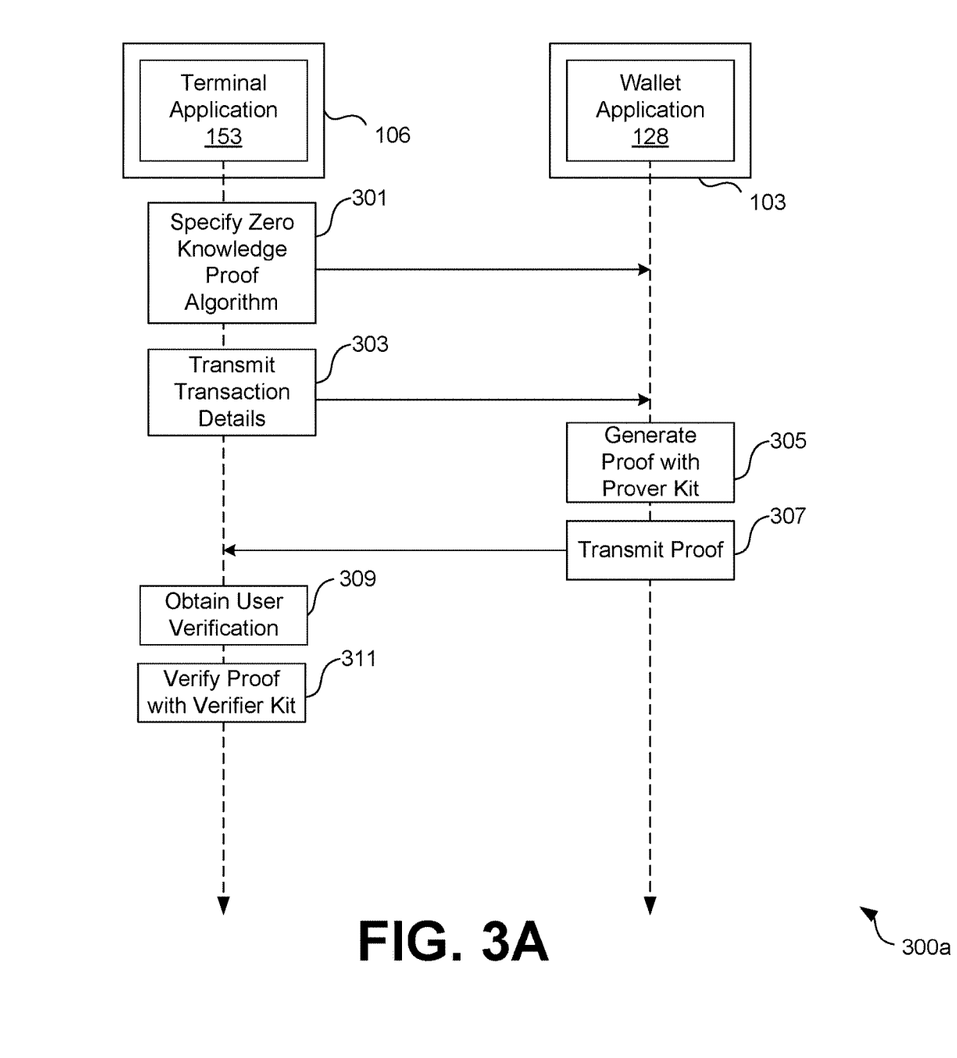
FIGS. 3A and 3B are sequence diagrams illustrating examples of functionality implemented as portions of the network environment of FIG. 1 according to various embodiments of the present disclosure.
Figure 3B:
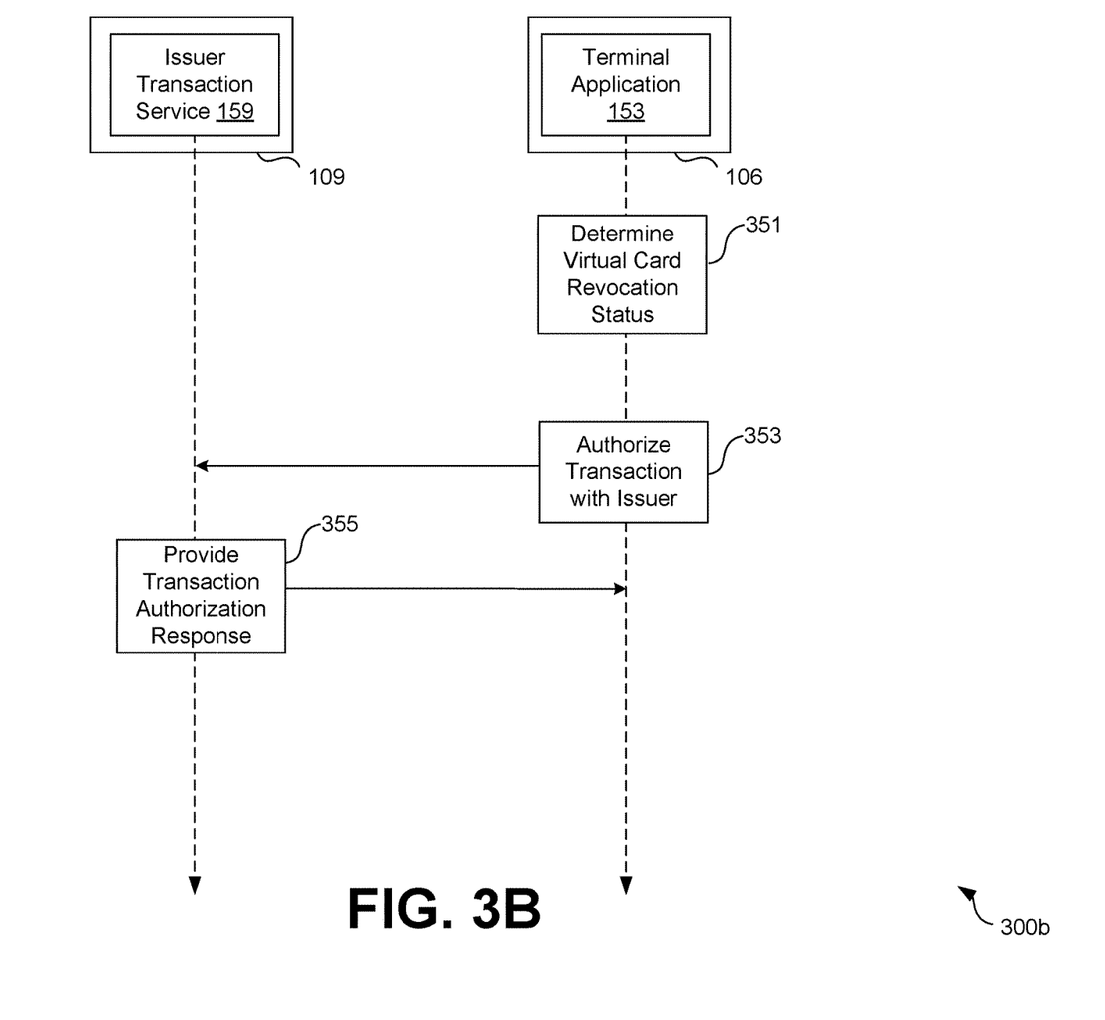

Turning now to FIGS. 3A-3B, shown are sequence diagrams 300a, 300b that provide an example of the operation of the components of the network environment 100. It is understood that the sequence diagrams of FIGS. 3A-3B provide merely an example of the many different types of functional arrangements that can be employed to implement the operation of the depicted portion of the network environment 100. As an alternative, the sequence diagrams of FIGS. 3A-3B can be viewed as depicting an example of elements of a method implemented within the network environment 100. In particular, the sequence diagrams of FIGS. 3A and 3B depict the functionality associated with the client device 103, the transaction terminal 106, and the issuer system 109 provisioning a transaction terminal 106 to accept payments from a virtual card 130 issued by the issuer. The sequence diagrams also depict how the client device 103, transaction terminal 106 and issuer system 109 can complete transactions using a virtual card 130 issued to the client device 103.

Again, a user can have a transaction account with an issuer that allows the issuer to make payments to a merchant on behalf of the user. According to various embodiments, the issuer and the merchant can have an agreement with one another such that the merchant trusts that the issuer will provide the funds to the merchant upon authorization of the transaction by the issuer. Additionally, the issuer can provision a transaction terminal 106 to complete transactions using the zero-knowledge proof algorithm specified and provided by the issuer and abide the other terms and conditions according to an agreement between the issuer and merchant. When a user having a transaction account with an issuer enters into a transaction with a merchant to purchase goods or services provided by the merchant, the user can present a virtual card 130 associated with the account to the transaction terminal 106 for processing the payment. Accordingly, the sequence diagram of FIG. 3A assumes that the merchant and user have initiated a payment transaction through a PoS system, a payment portal, or any other payment mechanism.

Accordingly, at step 301, upon initiation of a transaction between transaction terminal 106 and client device 103, the terminal application 153 can specify a zero-knowledge proof algorithm for use in the transaction. In some embodiments, the client device 103 can present a card type or information about the card issuer to the terminal application 153, and the terminal application 153 can locate an issuer configuration 157 that corresponds to the card type. Upon locating the appropriate issuer configuration 157, the terminal application 153 can provide an identifier corresponding to the zero-knowledge proof algorithm or a prover kit 124 to the client device 103.

In some embodiments, the terminal application 153 and HSM 129 can exchange communications to negotiate and agree upon a zero-knowledge proof algorithm to use to complete the transaction. For example, the two devices can provide a list of supported zero-knowledge proof algorithms that are permitted by the issuer and utilize a selection algorithm to select a zero-knowledge proof algorithm to be utilized in the transaction.

At step 303, the terminal application 153 can provide transaction details corresponding to the transaction to the client device 103. The transaction details can include a transaction amount, item quantities, information about the merchant, and other transaction details. In some embodiments, the client device 103 can provide the transaction details and the details of the virtual card 130 to the terminal application 153 along with a zero knowledge proof generated by the prover kit 124 to prove that the client device 103 was authorized to use the virtual card 130 for the transaction. The terminal application 153 can then use the verifier kit 155 to verify the zero knowledge proof. If verified, then the transaction can proceed.

At step 305, the client device 103 can generate a proof with the prover kit 124 corresponding to the zero-knowledge proof algorithm specified for use with the transaction. The prover kit 124 can represent a cryptographic process that generates a result that can be verified by a corresponding verifier kit 155. The inputs to the prover kit 124 can include information about the virtual card 130 issued to the client device 103, such as a personal identification number (PIN) of the virtual card 130, an account number of the virtual card 130, and the transaction details provided by the terminal application 153 at step 303.

Information about the virtual card 130, such as an identifier or number associated with the virtual card 130, can be an input into the prover kit 124. In one embodiment, the client device 103 can sign the transaction details with a private key or certificate of the client device 103. The signed transaction details can be an input into the prover kit 124. Additionally, the commitment data, which can be provided to the client device 103 by the issuer along with the virtual card 130, can also be an input into the prover kit 124. In some embodiments, the proof can be generated based upon the commitment data with the signed transaction details kept separate from the proof. The proof generated by the prover kit 124 can be a file or a cryptographic result of execution of the prover kit 124.

At step 307, the client device 103 can provide the proof to the terminal application 153. The client device 103 can communicate with the transaction terminal 106 over NFC, Bluetooth, a smart card communication mechanism, or a short-range communication interface. In some embodiments, the client device 103 and the transaction terminal 106 can communicate with one another over the network 112.

At step 309, the terminal application 153 can obtain user verification. The user verification can be a personal identification number (PIN) or a signature obtained on an input device of the transaction terminal 106. The user verification can also include obtaining and verifying a card verification number (CVN) associated with the virtual card 130.

At step 311, the terminal application can verify the proof obtained from the client device 103 with the verifier kit 155 specified by the issuer. The verifier kit 155 can take the proof as an input and return a Boolean value that represents the authority of the client device 103 and the virtual card 130 presented by the client device 103 embodied by the proof to enter into a transaction for the amount specified by the transaction details. The transaction details, signed by the client device 103, can be provided to the terminal application 153 along with the proof generated by the prover kit 124. Accordingly, the terminal application 153 can execute the verifier kit 155 with the proof and/or the signed transaction details as inputs. In some examples, the commitment data can also be an input to the prover kit 124.

Because a non-interactive zero-knowledge proof algorithm can be chosen, verifying the proof with the prover kit 124 can be accomplished without additional interaction with the client device 103. Accordingly, if the transaction details are properly signed by the client device 103, the prover kit 124 can verify the proof, and the transaction details are within specified parameters set forth by the commitment data, the transaction can be approved by the terminal application 153 upon verification of the proof. In some embodiments, additional verification can be performed.

Therefore, reference is made to FIG. 3B, which continues the sequence diagram of FIG. 3A. At step 351, the terminal application 153 can determine the revocation status of the virtual card 130 presented to the terminal application 153 by the client device 103. The terminal application 153 can determine the revocation status by determining whether the virtual card 130 is noted as valid or revoked on a distributed ledger 104. As noted above, the issuer service 159 can publish the public key 131 of the client device 103, signed by an issuer certificate, upon issuance of a virtual card 130 to the client device 103. The issuer service 159 can also publish an indication that a virtual card 130 has been revoked to the distributed ledger 104. Accordingly, the terminal application 153 can consult the distributed ledger 104 to determine whether a virtual card 130 presented by a client device 103 has been revoked by an issuer. If the terminal application 153 determines that a virtual card 130 has been revoked by the issuer by consulting the distributed ledger 104, the terminal application 153 can deny the transaction. In some cases, the terminal application 153 can consult the issuer service 159 to determine the revocation status of the virtual card 130.

Next, at step 353 the terminal application 153 can optionally further authorize the transaction by requesting the issuer service 159 to either approve or deny the transaction based upon the transaction details. At this step, the terminal application can transmit the transaction details to the issuer service 159. In some scenarios, the terminal application 153 can send the transaction details to the issuer service 159 for additional verification if the commitment data includes restrictions that do not permit the terminal application 153 to approve the transaction based upon the transaction details for the given transaction.

Accordingly, at step 355, the issuer service 159 can provide a transaction authorization response that indicates whether the transaction is approved or denied to the terminal application 153. The issuer service 159 can determine whether the transaction should be approved or denied based on the provided transaction details and an assessment of the account with which the transaction is associated. For example, the issuer service 159 can assess spending limits, credit limits, or other restrictions and parameters associated with an account of a particular user or entity to generate the transaction authorization response.

Figure 4:
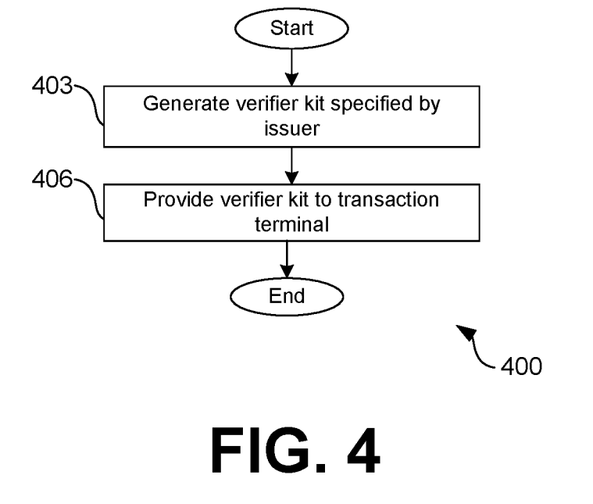
FIGS. 4-6 are flowcharts illustrating examples of functionality implemented as portions of the network environment of FIG. 1 according to various embodiments of the present disclosure.

Referring next to FIG. 4, shown is a flowchart 400 that provides one example of the operation of portions of the issuer service 159. It is understood that the flowchart of FIG. 4 provides merely an example of the many different types of functional arrangements that can be employed to implement the operation of the depicted portions of the issuer service 159 to provision a transaction terminal 106 to accept transactions from virtual cards 130 issued to client devices 103 by the issuer.

Beginning with step 403, the issuer service 159 can generate or obtain a verifier kit 155 that is specified by the issuer for use by transaction terminals 106 to verify proofs provided by client devices 103 that are attempting to conduct transactions using virtual cards 130. As noted above, the verifier kit 155 is associated with a zero-knowledge proof algorithm. The zero-knowledge proof algorithm can be specified by the issuer to be used to establish trust between the client device 103 that is presenting a virtual card 130 and a transaction terminal 106 that is processing a transaction on behalf of a merchant.

Next, at step 406, the issuer service 159 can provide the verifier kit 155 to the transaction terminal 106. As noted above, the issuer service 159 can provide the verifier kit 155 to the transaction terminal 106 in various ways. The issuer service 159 can allow the transaction terminal 106 to download the verifier kit 155 directly from the issuer service 159 or from a software download location. As another example, the issuer service 159 can publish the verifier kit 155 to a distributed ledger 104, and the transaction terminal 106 can obtain the verifier kit 155 from the distributed ledger 104. In some embodiments, the issuer service can publish a reference to the verifier kit 155, and the transaction terminal 106 can obtain the verifier kit 155 from a third party location.

As also noted above, the issuer service 159 can provide an issuer configuration 157 to the transaction terminal 106. The issuer configuration 157 can include other configuration parameters that allow the transaction terminal 106 to be configured to accept payments from client devices 103 that present a virtual card 130 issued by the issuer service 159. For example, the issuer configuration 157 can include server addresses, authentication information, or other configuration parameters that a transaction terminal 106 may require to be configured in order to process payments on behalf of an issuer. Once the transaction terminal 106 is configured to accept payments on behalf of the issuer, the process proceeds to completion.

Figure 5:
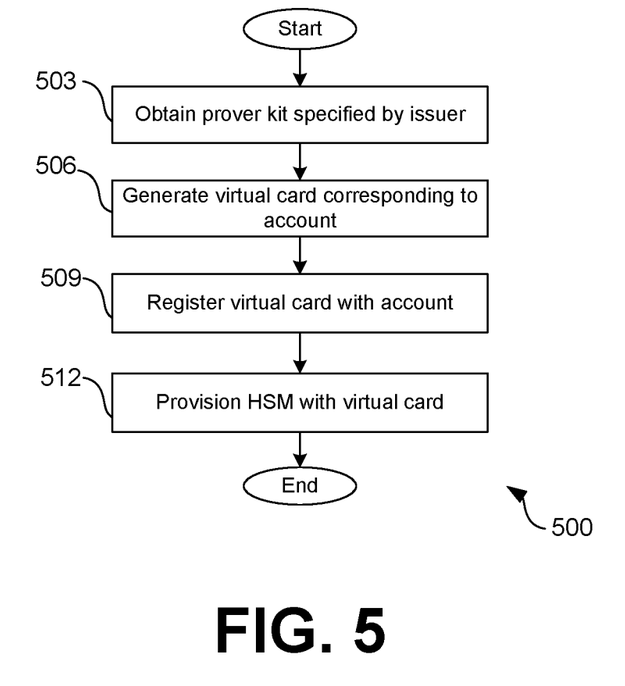

Referring next to FIG. 5, shown is a flowchart 500 that provides one example of the operation of portions of the issuer system 109. It is understood that the flowchart of FIG. 5 provides merely an example of the many different types of functional arrangements that can be employed to implement the operation of the depicted portions of the issuer service 159. FIG. 5 illustrates how the issuer service 159 can issue a virtual card 130 to a client device 103 or HSM 129.

First, at step 503 the issuer service 159 can obtain a prover kit 124 corresponding to the zero-knowledge proof algorithm specified by the issuer. In some embodiments, the prover kit 124 can be uniquely generated for the virtual card 130 being issued to the client device 103. In other embodiments, the issuer can specify a single prover kit 124 that can be utilized by various client devices 103. In certain cases, a standardized prover kit 124 corresponding to a standardized zero-knowledge proof algorithm can be utilized.

At step 506, the issuer service 159 can generate a virtual card 130 corresponding to an account with the issuer. The issuer service 159 can include imagery, text, and other information that can be displayed by a wallet application on the client device 103 as a part of the virtual card 130. The virtual card 130 can include the public key 131 of the client device 103 signed by the certificate of the issuer.

The issuer service 159 can also include commitment data as a part of the virtual card 130. As noted above, the commitment data can include one or more restrictions associated with the virtual card 130 that the terminal application 153 can enforce on behalf of the issuer. The restrictions can include transaction limits, daily spending limits, and other restrictions imposed on the virtual card 130 by the issuer.

At step 509, the issuer service 159 can register the virtual card 130 with an account with the issuer. To register the virtual card 130 with an account, information about the virtual card 130 can be saved in the issuer virtual card data 158 of a particular account. The virtual card 130 that is generated can be uniquely associated with an account such that no two virtual cards 130 have the same identifier. The virtual card 130 can be registered with an account so that transactions made with a virtual card 130 are charged against the appropriate account with the issuer.

At step 512, the issuer service 159 can provision the HSM 129 with the virtual card 130. To provision the HSM 129, the issuer service 159 can transmit the virtual card 130, which can include a bundle of data including the prover kit 124 to be utilized to facilitate transactions, the signed public key 131 of the client device, commitment data, and any other imagery, text, or information to be displayed when the virtual card 130 is being utilized by the client device 103 to complete transactions with a transaction terminal 106.

Figure 6:
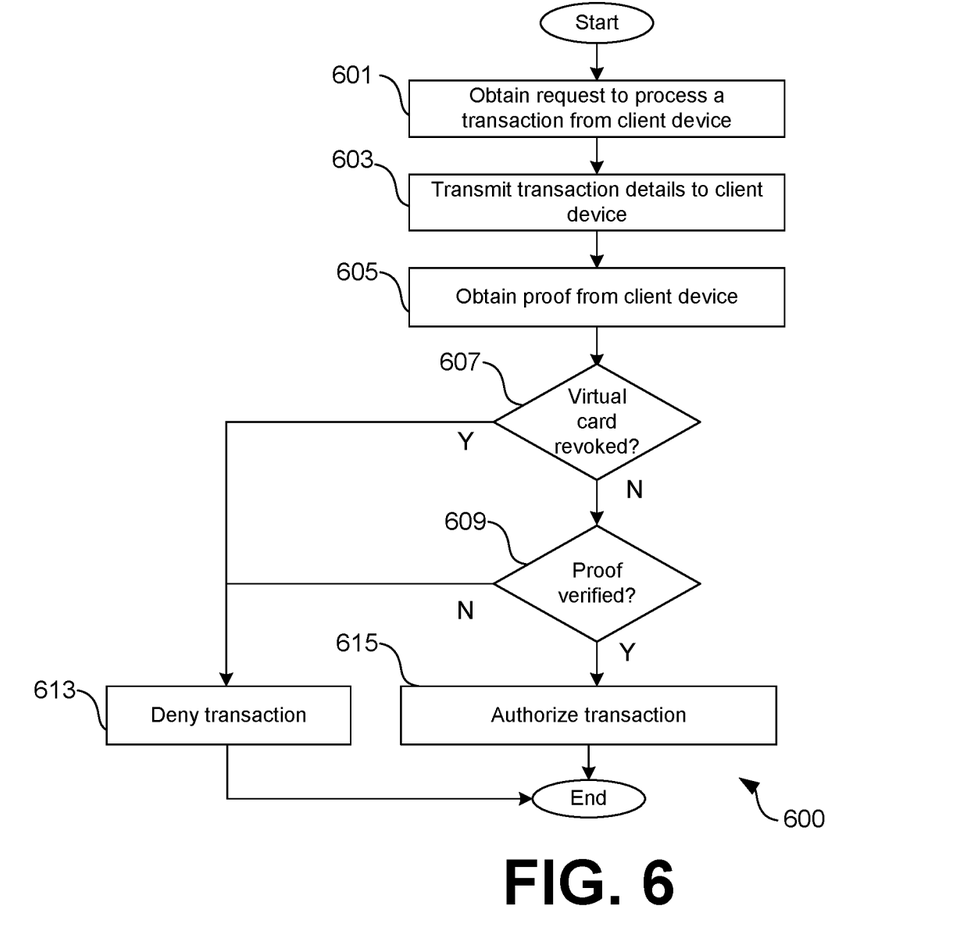

Referring next to FIG. 6, shown is a flowchart 600 that provides one example of the operation of portions of the transaction terminal 106. It is understood that the flowchart of FIG. 6 provides merely an example of the many different types of functional arrangements that can be employed to implement the operation of the depicted portions of the terminal application 153. FIG. 6 illustrates how the terminal application 153 can process a transaction with a virtual card 130 issued by an issuer to a client device 103 or HSM 129.

First, at step 601, the terminal application 153 can obtain a request to process a transaction with a virtual card 130 from an HSM 129. The request can be initiated in response to the merchant seeking payment using a PoS terminal, a payment device, a web-based payment portal, or the like. The request can be generated in response to a user presenting a client device 103 to a transaction terminal 106, which initiates an NFC session or another short-range communication session in which the virtual card 130 can be presented to the transaction terminal 106. The virtual card 130 can be presented to the transaction terminal 106 by transmitting the signed public key 131 of the client device 103 that was provisioned by the issuer service 159 to the terminal application 153.

At step 603, the terminal application 153 can transmit the transaction details to the client device 103. The transaction details can include a transaction amount, item quantities, information about the merchant, and other transaction details. In some examples, the terminal application 153 can also negotiate a zero-knowledge proof algorithm with the client device 103 that will be used to validate the transaction between the client device 103 and the transaction terminal 106. In some examples, the zero-knowledge proof algorithm has been specified by the issuer and is already known by the client device 103 and transaction terminal 106 for user with transactions involving the virtual card 130.

At step 605, the terminal application 153 can obtain a proof from the client device 103. The proof can be generated by the prover kit 124. The proof can be generated based upon the virtual card 130 provisioned to the client device 103 by the issuer. In some examples, along with or incorporated into the proof can also be the transaction details signed using a private key or certificate of the client device 103.

At step 607, the terminal application 153 can determine whether the virtual card 130 has been revoked. The terminal application 153 can query a distributed leger about the revocation status of the virtual card 130. In other embodiments, the terminal application 153 can query the issuer service 159 about the revocation status of the virtual card 130. If the virtual card 130 has been revoked, the process can proceed to step 613, where the terminal application 153 can deny the transaction with the client device 103. If the virtual card 130 has not been revoked, the process can proceed to step 609 from step 607.

At step 609, the terminal application 153 can verify the proof using the verifier kit 155 associated with the zero-knowledge proof algorithm that is being utilized to validate the transaction. In some examples, the proof can be based upon the transaction details signed by the client device 103 and/or the commitment data associated with the virtual card 130. If the proof cannot be verified, the process can proceed to step 613, where the terminal application 153 can deny the transaction with the client device 103. If the proof can be verified, the process can proceed to step 609 to 615.

At step 615, the terminal application 153 can authorize the transaction. In some embodiments, the terminal application 153 can provide a transaction confirmation to the issuer system 109, which can confirm that funds or credit are available for the virtual card 130 and credit a merchant account with an amount corresponding to the transaction details. Thereafter, the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method comprising:
    transmitting, by a client device via a wallet application executing on the client device and to an issuer service of an issuer system, data comprising a request for a virtual card, the data comprising a public key of the client device and an account identifier, wherein the public key is for the issuer service to generate the virtual card;

obtaining, by the client device via the wallet application, the virtual card from the issuer service based at least in part on the data comprising the request for the virtual card, the virtual card comprising the public key of the client device and a prover kit corresponding to a zero-knowledge proof algorithm, the prover kit being a process that generates proofs according to the zero-knowledge proof algorithm, the virtual card further being uniquely associated with an account with the issuer service;

obtaining, by the client device via the wallet application, transaction details corresponding to a transaction from a transaction terminal and an identifier specifying the zero-knowledge proof algorithm;

generating, by the client device via the wallet application and using the prover kit, a proof to prove that the transaction is authorized by the issuer service based at least in part on inputting data associated with the virtual card and the transaction details into the zero-knowledge proof algorithm specified by the identifier obtained from the transaction terminal, the proof representing an authority of the client device to complete the transaction;

providing, by the client device via the wallet application, the proof to the transaction terminal; and after the proof is verified by the transaction terminal, completing, by the client device via the wallet application, the transaction with the transaction terminal.

2. The method of claim 1, wherein the virtual card further comprises at least one commitment parameter, the at least one commitment parameter being encrypted with a public key of the client device, and the at least one commitment parameter further defining at least one restriction associated with the virtual card.

3. The method of claim 2, wherein the at least one commitment parameter is signed using a certificate of the issuer service.

4. The method of claim 1, wherein the virtual card comprises a signed version of the public key associated with the client device, the signed version of the public key being signed by an issuer certificate.

5. The method of claim 1, wherein generating the proof further comprises signing, by the client device, the transaction details with a private key of the client device.

6. The method of claim 1, wherein providing the proof to the transaction terminal comprises initiating, by the client device, a near-field communication (NFC) session with the transaction terminal.

7. The method of claim 1, wherein the prover kit is executed by a hardware security module of the client device.

8. A system, comprising:
a client device comprising:
  a processor; and
  a memory storing at least one wallet application and instructions that when executed, by the processor causes the processor to at least:
    transmit, via the wallet application, to an issuer service of an issuer system, data comprising a request for a virtual card, the data comprising a public key of the client device and an account identifier, wherein the public key is for the issuer service to generate the virtual card;
    obtain, via the wallet application, the virtual card from the issuer service based at least in part on the data comprising the request for the virtual card, the virtual card comprising the public key of the client device and a prover kit corresponding to a zero-knowledge proof algorithm, the prover kit being a process that generates proofs according to the zero-knowledge proof algorithm, the virtual card further being uniquely associated with an account with the issuer service;
    obtain, via the wallet application, transaction details corresponding to a transaction from a transaction terminal and an identifier specifying the zero-knowledge proof algorithm;
    generate, via the wallet application and using the prover kit, a proof to prove that the transaction is authorized by the issuer service based at least in part on inputting data associated with the virtual card and the transaction details into the zero-knowledge proof algorithm specified by the identifier obtained from the transaction terminal, the proof representing an authority of the client device to complete the transaction;
    provide, via the wallet application, the proof to the transaction terminal; and
    after the proof is verified by the transaction terminal, complete, via the wallet application, the transaction with the transaction terminal.

9. The system of claim 8, wherein the virtual card further comprises at least one commitment parameter, the at least one commitment parameter being encrypted with a public key of the client device, and the at least one commitment parameter further defining at least one restriction associated with the virtual card.

10. The system of claim 9, wherein the at least one commitment parameter is signed using a certificate of the issuer service.

11. The system of claim 8, wherein the virtual card further comprises a public key associated with the client device, the public key being signed by an issuer certificate.

12. The system of claim 8, wherein generating the proof further comprises signing the transaction details with a private key of the client device.

13. The system of claim 8, wherein providing the proof to the transaction terminal further comprises initiating a near-field communication (NFC) session with the transaction terminal.

14. The system of claim 8, wherein the prover kit is executed by a hardware security module of the client device.

15. A non-transitory computer-readable medium storing a wallet application and program instructions that, when executed by a processor of a client device, causing the processor of the client device to at least:

transmit, via the wallet application to an issuer service of an issuer system, data comprising a request for a virtual card, the data comprising a public key of the client device and an account identifier, wherein the public key is for the issuer service to generate the virtual card;

obtain, via the wallet application, the virtual card from the issuer service based at least in part on the data comprising the request for the virtual card, the virtual card comprising the public key of the client device and a prover kit corresponding to a zero-knowledge proof algorithm, the prover kit being a process that generates proofs according to the zero-knowledge proof algorithm can be verified, the virtual card further being uniquely associated with an account with the issuer service;

obtain, via the wallet application, transaction details corresponding to a transaction from a transaction terminal and an identifier specifying the zero-knowledge proof algorithm;

generate, via by the wallet application and using the prover kit, a proof to prove that the transaction is authorized by the issuer service based at least in part on inputting data associated with the virtual card and the transaction details into the zero-knowledge proof algorithm specified by the identifier obtained from the transaction terminal, the proof representing an authority of the client device to complete the transaction;

provide, via the wallet application, the proof to the transaction terminal; and after the proof is verified by the transaction terminal, complete, via the wallet application, the transaction with the transaction terminal.

16. The non-transitory computer-readable medium of claim 15, wherein the virtual card further comprises at least one commitment parameter, the at least one commitment parameter being encrypted with a public key of the client device, and the at least one commitment parameter further defining at least one restriction associated with the virtual card.

17. The non-transitory computer-readable medium of claim 16, wherein the at least one commitment parameter is signed using a certificate of the issuer service.

18. The non-transitory computer-readable medium of claim 15, wherein the virtual card further comprises a public key associated with the client device, the public key being signed by an issuer certificate.

19. The non-transitory computer-readable medium of claim 15, wherein providing the proof to the transaction terminal further comprises initiating a near-field communication (NFC) session with the transaction terminal.

20. The non-transitory computer-readable medium of claim 15, wherein the prover kit is executed by a hardware security module of the client device.

* * * * *